United States Patent Office 3,551,372
Patented Dec. 29, 1970

3,551,372
COMPOSITION AND PROCESS FOR COVERING, COATING AND FILLING CAVITIES OR DEPRESSIONS
Erich Bader, Hanau am Main, and Hubert Koert and Gerd Brod, Grossauheim, Germany, assignors to Deutsche Gold- und Silber-Scheideanstalt vormals Roessler, Frankfurt am Main, Germany
No Drawing. Continuation of application Ser. No. 404,511, Oct. 16, 1964. This application Dec. 20, 1967, Ser. No. 692,248
Claims priority, application Germany, Dec. 12, 1963, D 43,156
Int. Cl. C08f *15/30, 45/52*
U.S. Cl. 260—28.5         3 Claims

ABSTRACT OF THE DISCLOSURE

A polymerizable composition useful for coating, filling, sealing and waterproofing various substrates, and the process for the use thereof, which consists essentially of
(A) about 50 to 95% by weight of said composition of polymerizable monomer compounds consisting of
  (i) about 1 to 50% by weight of said composition of acrylic acid esters and methacrylic acid esters whose alcohol components contain more than 4 carbon atoms, and
  (ii) the remainder of said polymerizable monomer compounds consisting of methacrylic acid esters whose alcohol components contain 2 to 4 carbon atoms,
(B) about 5 to 50% by weight of said composition of polymeric compounds consisting of
  (i) a vinyl chloride interpolymer which is soluble in said (A) monomers, and
  (ii) any remainder of the polymeric compound consisting of polymers of the (A) monomers which are soluble in the (A) monomers, and
(C) sufficient quantities of catalyst to effect the polymerization of the (A) monomers.

CROSS-REFERENCE TO RELATED APPLICATIONS

This application is a continuation of application Ser. No. 404,511, entitled "Composition and Process for Covering, Coating and Filling Cavities and Depressions" and filed Oct. 16, 1964 in the names of Erich Bader, Hubert Koert and Gerd Brod, and now abandoned.

BACKGROUND OF THE INVENTION (1) Field of the invention

The present invention relates to polymerizable cold hardening coating, filling, sealing and waterproofing composition based on vinyl chloride interpolymers and certain acrylic acid esters and methacrylic acid monoesters.

(2) Description of the prior art

The reference made of record during the prosecution of the parent application Ser. No. 404,511 are as follows: U.S. 2,567,719; U.S. 2,569,954; U.S. 3,037,955; U.S. 3,061,459; U.S. 3,247,289; Canadian Patent 533,413; Schildknecht, "Polymer Processes," Interscience Publishers, N.Y., 1956, page 547; Smith, "Vinyl Resins," Reinhold Publishing Corp., N.Y. 1961, pages 199 and 204; and Von Fischer et al., "Organic Protective Coatings," Reinhold Publishing Corp., N.Y., 1953, pages 61–80.

SUMMARY OF THE INVENTION

The object of the present invention is to provide polymerizable compositions, and processes for the use thereof, which may be employed at relatively low temperatures for coating, sealing, filling and waterproofing various substrates.

The essence of the present invention lies in the use of polymerizable compositions based on vinyl chloride polymers and certain polymerizable acrylic acid esters and methacrylic acid monoesters in combination with a curing or hardening agent for the polymerizable ester compounds.

DESCRIPTION OF THE PREFERRED EMBODIMENT

It is known that streets and various substrates made of concrete, bitumen, asphalt and the like can be coated or covered with a plastic or resin mass for protection against frost damage, salt erosion, abrasion or for providing markings, liberating dust or carrying out repairs. These masses can also be used for waterproofing swimming pools, silos, quenching tanks, dams and the like. Likewise they are useful for producing resistant coatings on horizontal or vertical concrete surfaces, for instance, on balconies, terraces, patios, industrial rooms or halls, warehouses, cellars or basements, concrete bridges, as well as on walls or surfaces of other construction materials, such as brick, plates, concrete or cinder block and the like. Moreover, these masses are suitable for spreading or brushing onto iron or steel for protection against corrosion. Examples for this are spreading on bridges, industrial halls or rooms, railroad cars, piping, dock construction, ship structures and walls, boilers and other containers.

The plastic or resin masses known heretofore for these purposes consist of systems which harden or cure at lower temperatures and in addition to unsaturated polyester or epoxide resins contain the corresponding hardeners in admixture. They often have the disadvantage that they cannot be cured or hardened at temperatures below 10° C. or only very incompletely cured. The result is defective adhesion to the substrate. They are moreover on the whole not applicable at temperatures below freezing. In many cases the duly hardened mass does not have the desired elasticity and weather resistance.

It is also known to use an agent consisting of a mixture or hydraulically bound structural materials containing sand, gravel, chips and the like or consisting of natural stone, which are added to a mixture of monomeric and polymeric methyl methacrylate, a hardener, and an inorganic filler. A viscosity lowering agent can also be added to this mixture.

It has now been found that a composition is advantageous as the cold-hardening or self-curing agent for coating, covering or sealing a substrate, especially one comprising a mixture of hydraulically bound construction materials containing sand, gravel, chips and the like or natural stone or consisting of metals, such as copper, zinc, aluminum and especially iron or steel or their alloys, as well as for filling depressions, cracks and joints in or between these materials, which has as the basis of the mixture monomeric polymerizable organic compounds, polymers, polymerization catalysts and, if necessary, a filler. The polymerizable material that is, the polymerizable mixture, consists essentially of a mixture of: (a) a methacrylic acid methyl ester and suitably at least one further methacrylic acid ester whose alcohol component has 2 to 4 carbon atoms, (b) at least one acrylic acid ester or methacrylic acid ester, whose alcohol component contains more than 4, preferably 6 to 10, carbon atoms and (c) at least one copolymer or interpolymer, soluble in the monomer, of vinyl chloride, especially copolymers of vinyl chloride with at least one of the compounds selected from the group consisting of vinyl acetate, maleic acid, maleic acid esters, maleic acid anhydride and mixtures of the corresponding copolymers or interpolymers and suitably a monomer soluble polymer or copolymer of the monomers given in (a) and (b).

These mixtures can contain in addition known plasticizers, especially polymer plasticizers, and/or solvents, stabilizers, fillers, pigments and other known additives.

The masses according to the invention are distinguished, for example, from other similar methyl methacrylate polymer-monomer compositions, especially by their increased impact toughness and especially good adhesion to the substrate even under the influence of water and aqueous solutions. In addition, they have a very smooth upper surface upon curing, have low susceptibility for dirt and are cleaned easily and well. They are universally dyable or colorable and on this basis can be used especially for marking.

Of the esters of methacrylic acid which are suitable for the composition of the invention the methacrylic acid methyl esters are preferred. Beyond these, esters of higher alcohols of many types are usable, especially those of multivalue alcohols such as ethylene glycol, triethylene glycol, dipropylene glycol, glycerine, sorbitol and the like.

Examples of esters of acrylic acid or methacrylic acid which can be used are n-butyl acrylate, n-hexyl acrylate, n-octyl acrylate, 2-ethylhexyl acrylate, decyl acrylate, lauryl acrylate and the corresponding methacrylates. The esters whose alcohol components have 6 to 10 carbon atoms are preferred, since they cause an optimum elasticizing effect in polymerization activity upon the total mixing, and cause lower volatility and less take up of water by the polymers. These esters of acrylic acid or methacrylic acid can be present in amounts of about 1 to about 50% by weight.

It is possible to use the polymers of the given monomers, e.g., the monomers of components (a) and (b) above, as homopolymers, copolymers or interpolymers. The polymers are added suitably in amounts of about 0.5 to about 50% by weight.

In place of solutions of the polymers in the monomers syrups can be used as the starting material which contain the polymerizable material in the form of a prepolymer obtained by partial polymerization.

The copolymers of vinyl chloride can be added as suspension or emulsion copolymers however. The vinyl chloride should make up at least 50% of the total amount of the copolymer. Their K value desirably lies between 30 and 80. In many cases it is advantageous if a copolymer having, for example, a small vinyl acetate content is mixed with undiluted or pure polyvinyl acetate. Moreover, maleic acid and its esters as well as maleic acid anhydride, for example, can also be components in the copolymer. These components desirably comprise less than 30% of the total polymers. In addition, it is also possible to mix copolymers, for example, copolymers of vinyl chloride and vinyl acetate, with other copolymers, for example, copolymers of vinyl chloride and maleic acid esters. In the above cases a further addition of polyvinyl acetate is also possible.

The above polymers, copolymers, or polymer mixtures are dissolved in the monomers such that the resulting solution consists of a fluid having the consistency of a syrup.

A good workable consistency is achieved by selecting or controlling the degree of polymerization and the amount of polymers in solution. This consistency is suitable between about 200 and about 20,000 cps. and the amount of polymers comprises between about 5 and about 50% by weight of the total mixture.

In order to achieve the desired consistency a small amount of solvent, for example, an ester such as butyl acetate, a glycol ether, a ketone such as methyl ethyl ketone or acetone, an aromatic hydrocarbon such as benzene or xylene or a chlorinated hydrocarbon such as a chlorobenzene or perchloroethylene can be added to the mixture. In such cases the amount of solvent comprises up to about 20% by weight of the total mixture. Compatible aliphatic hydrocarbons and alcohols can also be added. Especially good adhesion which does not subside after long aging can be achieved through the presence of these solvents in the cured mass or coating.

It is desirable to add small amounts of soluble paraffins and/or types of waxes in a known manner to the mixture to resist air inhibition.

Moreover, it is advantageous to add small amounts of free acrylic or methacrylic acid, preferably in amounts of about 0.01 to about 5% by weight calculated on the monomer component, in order to improve adhesion. Suitable plasticizers, which can be added to the agents before hand, are phthalates such as dibutyl phthalate, propyl phthalate and dioctyl phthalate, adipates such as dibutyl adipate and dioctyl adipate, sebacates such as dibutyl sebacate and propyl sebacate, chlorinated di, tri and polyphenols, chlorinated paraffins and drying oils which can also be partially epoxidized. The preferred polymeric plasticizers are esters from polybasic acids and multivalue alcohols such as polyadipates and polysebacates derived from adipic and sebacic acid and ethylene glycol, butylene glycol, propylene glycol etc.

Catalysts can be used for hardening or curing the mixture according to the invention which are known for vinyl polymerizations. Preferably such catalysts are selected which effect curing or hardening in the temperature range of about −30 to about +50° C. within a short time, that is, within a time of about 12 hours. Such catalyst systems are also preferred which comprise at least one tertiary amine as well as, if necessary, other known accelerators and/or promoters and/or cocatalysts. The preferred tertiary amines are those whose nitrogen atom is connected directly with at least one aromatic group such as dimethyl-p-toluidine. The preferred peroxides are acyl peroxides such as benzoyl peroxide, lauroyl peroxide and 2,4-dichlorobenzoyl peroxide. Examples of other constituents which are suitable for such known catalyst systems are organic sulfur compounds, especially mercaptans, besides α-oxysulfones and heavy metal compounds. The mixtures can also contain known inhibitors, such as hydroquinone, and stabilizers, which produce sufficient weather resistance for the polyvinyl chloride components. Examples of such stabilizers include metal compounds, especially fatty acid salts of barium, cadmium, zinc and calcium. Organic tin compounds, known as polyvinyl chloride stabilizers, can also be added for the same purpose. Known ultra violet stabilizers can also be added to the mixtures, for example, derivatives of benzophenones or benzotriazols. A preferred type of stabilizer is the organic ester of the phosphorous acid, like triphenyl phosphite.

Fillers within the scope of the invention comprise sand, powdered stone, powdered asbestos, carborundum, gypsum, chalk, zinc oxide, sawdust, barium sulfate and insoluble, granulated or pulverized plastic and resin masses. Preferably such fillers are employed which are thixotropic, especially pyrogenically produced silicic acid, i.e., Aerosil.® All color fast dyes or coloring materials which are useful for coloring acrylic plastic and resin materials can be used as pigments for the masses of the invention. It is only necessary to see that these known additives and supplemental components do not adversely hinder the polymerization.

The ranges of amounts of each of the above additives, fillers and supplemental components to be used in the mixture according to the invention will be determined by the end use of the mixture. In general the amounts employed in acrylic and polyvinyl chloride resins and plastics heretofore are suitable for the masses of this invention.

If all of the constituents of the mixture, especially the complete catalyst system, are mixed, the resulting mass is designed to be used immediately. However, it is also possible to produce the mass in a storable condition in which the mixture is divided into two parts, one part containing the catalyst system and the other part containing the other components. For example, a polymerization accelerator may be added to one part and the catalyst or hardener to the other. Before use both parts are mixed together and then applied to the substrate, either batchwise by hand or continuously, for example, with the aid of a two component spray gun.

In use it is advantageous to apply the coating comprising the agent according to the invention in two or more different layers. The first layer is especially adherent and seals or fills the pores of the substrate. The other layer or layers provide special abrasion, impact and weather resistance. The first layer may suitably comprise a mixture of about 30 to about 80% by weight of a monomeric polymerizable organic substance like methyl methacrylate and about 20 to about 50% by weight of a polymerized organic substance dissolved in said monomeric substance, for example polymethyl methacrylate, or resp. in addition about 5 to about 70% by weight of a chlorinated terphenyl or diphenyl. Preferably the polymethyl methacrylate is used in the form of a prepolymer obtained by partial polymerization. The second layer may comprise a mixture as described before.

In using the agent according to the invention upon surfaces which, for example, contain air inclusions due to their porosity it is advantageous to apply a primer before applying the agent. The same also applies to such substrates which can be dissolved by the agent or in which the agent can dissolve. Known primers can be used for this purpose, however, preferably they should consist of a polymerizable mixture which contains a monomeric polymerizable substance and a polymer, e.g., a reaction lacquer. This mixture should cure or harden quickly, for example, by using a so-called redox catalyst which consists, for instance, of a peroxidic compound and a tertiary amine. The consistency of the mixtures should be controlled or determined such that they contain a high amount of polymer component and at the same time have as low a viscosity as possible. Moreover, they should display good wetting properties and not be too insoluble. On the other hand, they should enable the formation of a good bond with the coating mass.

If iron or steel is to be coated, an adhesive base known per se or a so-called wash-primer can serve as the first layer. However, the mass according to the invention can be used in a composition which contains a corrosion inhibiting additive such as powdered zinc, zinc chromate, red lead and the like. The surface of the iron can also be phosphatized or rendered passive in a known manner.

Sand, gravel, chips or the like can be sprinkled or strewn over the coating after application and while it is still fluid or soft in order to give the coated substrate a rough upper surface. The sprinkled or strewn material is bound, fixed or imbedded firmly in the plastic or resin mass while it hardens without compressing or rolling the surface.

The composition and process of the invention are further set out by way of illustration in the following examples. The parts and percentages employed in the examples, specification and claims are by weight unless otherwise specified.

EXAMPLE 1

25 parts of a copolymer having a K value of 55 prepared from 26 parts of vinyl chloride and 40 parts of vinyl acetate were dissolved in

| | Parts |
|---|---|
| Monomeric methyl methacrylate | 45 |
| n-Hexyl acrylate | 30 |
| Dimethyl-p-toluidine | 0.3 |
| Lauryl mercaptan | 0.2 |
| Paraffin having a melting point of 52 to 54° C. | 0.3 |

50 parts of this solution were mixed with 50 parts of ground shale. Shortly before use the mass was mixed with one part of hardener paste consisting of 50% benzoyl peroxide in dioctyl phthalate. A dry concrete surface was first painted or primed with a mixture consisting of 50 parts monomeric methyl methacrylate, 10 parts glycol dimethacrylate and 20 parts polymeric methyl methacrylate having a K value of 50, 3 parts dimethyl aniline and 3 parts p-chlorobenzoyl peroxide. This layer completely hardened in about 15 minutes. Then the above mixture according to the invention was applied to the first layer and provided a smooth, resistant covering or coating. Curing or hardening was complete at 20° C. in about 2 hours.

EXAMPLE 2

5 parts of a copolymer produced from 80 parts vinyl chloride and 20 parts maleic acid ethyl ester having a K value of 60 was dissolved in a mixture of

| | Parts |
|---|---|
| Methyl ethyl ketone | 5 |
| Xylene | 5 |
| A polyadipate from adipic acid and butylene glycol | 5 |

Into the resulting solution was stirred

| | Parts |
|---|---|
| Ethylhexyl acrylate | 20 |
| Dimethyl-p-toluidine | 0.5 |
| Lauryl mercaptan | 0.1 |
| Paraffin melting at 52 to 54° C. | 0.3 |

This solution was combined with 65 parts of a methyl methacrylate composition containing about 30% polymeric methyl methacrylate and the remainder monomeric methyl methacrylate. 100 parts of powdered quartz and 2 parts of the benzoyl peroxide paste of Example 1 were then added and the resulting mass had a pot life of 20 minutes. The mass was brushed onto a steel container which was freshly sand blasted and after one hour was hardened and provided a firmly adhering corrosion resistant coating.

EXAMPLE 3

15 parts of chlorinated terphenyl (60% chlorine content)
15 parts of a copolymer having a K value of 50 prepared from 60 parts of vinyl chloride and 40 parts of vinyl acetate and
10 parts of polymethyl methacrylate having a K value of 25 were dissolved in 40 parts of monomeric methyl methacrylate and
10 parts of monomeric 2-ethylhexylacrylate.

To this solution 0.3 part of dimethyl-p-toluidine
1.0 part of triphenylphosphite
0.5 part of paraffin having a melting point of 48 to 52° C.
8.2 parts of polysebacate, prepared from sebacic acid and ethylene glycol were added.

40 parts of this solution were mixed with 30 parts of quartz sand, 20 parts of powdered quartz and 10 parts of corundum. Shortly before use the mass was mixed with one part of a hardener paste consisting of 50% benzoyl peroxide in dibutyl phthalate. The pot life was 13 minutes and the hardening time 25 minutes at 20° C.

In addition the mixtures of this invention also may contain at least one chlorinated diphenyl or terphenyl. The amount of these substances should make up to about 35% by weight and preferably lies between about 5 and about 35% by weight of the total mixture. The chlorine content of these substances generally lies between about 40 and about 70%.

We claim:
1. The process of making a cold hardening polymerizable composition, comprising the steps of
  (a) mixing about 50 parts by weight of a solution consisting essentially of about, in weight ratio,
    25 parts of a copolymer of vinyl chloride and vinyl acetate,
    45 parts of monomeric methyl methacrylate,
    30 parts of n-hexyl acrylate,
    0.3 part of dimethyl-p-toluidine,
    0.2 part lauryl mercaptan, and
    0.3 part paraffin
  with about 50 parts by weight of a finely divided filler; and
  (b) mixing the composition resulting from (a) with a minor proportion by weight of a peroxidic hardener.
2. The process of making a cold hardening polymerizable composition, comprising the steps of
  (a) dissolving, in weight ratio, about 5 parts of a copolymer of vinyl chloride and maleic acid ethyl ester in a mixture of about 10 parts organic solvent and about 5 parts of a polyadipate from adipic acid and butylene glycol to form a first solution,
  (b) mixing into said first solution a composition comprising, in weight ratio, about 20 parts ethyl hexyl acrylate, 0.5 part dimethyl-p-toluidine, 0.1 part lauryl mercaptan and 0.3 part paraffin, to form a second solution;
  (c) combining said second solution with about 65 parts by weight of a mixture of about 40% polymeric methyl methacrylate and remainder monomeric methyl methacrylate to form a polymerizable mass; and
  (d) mixing said polymerizable mass with about 100 parts by weight of finely divided filler and a minor proportion by weight of peroxidic hardener.
3. The process of making a cold hardening polymerizable composition, comprising the steps of
  (a) dissolving, in weight ratio, about 15 parts of chlorinated terphenyl, 15 parts of a copolymer of vinyl chloride and vinyl acetate, and 10 parts of polymethyl methacrylate in a mixture of, in weight ratio, about 40 parts of monomeric methyl methacrylate and 10 parts of monomeric 2-ethyl hexyl acrylate to form a first solution;
  (b) adding to said first solution, in weight ratio, about 0.3 part dimethyl-p-toluidine, 1.0 part triphenyl phosphite, 0.5 part paraffin, and 8.2 parts of a polysebacate from sebacic acid and ethylene glycol;
  (c) mixing, in weight ratio, about 40 parts of the resulting mass with about 60 parts of finely divided filler to form a hardenable mass; and
  (d) mixing said hardenable mass with a minor proportion by weight of peroxidic hardener.

References Cited

UNITED STATES PATENTS

| | | | |
|---|---|---|---|
| 2,567,719 | 3/1948 | Loritsch | 260—31.8 |
| 2,569,954 | 10/1951 | Ruebensaal | 154—140 |
| 3,037,955 | 6/1962 | Carmen | 260—30.6 |
| 3,061,459 | 10/1962 | Bader | 117—75 |
| 3,247,289 | 4/1966 | Sears | 260—884 |

FOREIGN PATENTS

| | | | |
|---|---|---|---|
| 533,413 | 11/1956 | Canada | 260—28.5 |

OTHER REFERENCES

Schildknecht: "Polymer Processes," Interscience Pub., N.Y., 1956, p. 547.

Smith: "Vinyl Resins," Reinhold Pub., N.Y., 1961, pp. 199, 204.

Von Fischer: "Organic Protective Coatings," Reinhold Pub., N.Y., 1953, pp. 61–80.

MORRIS LIEBMAN, Primary Examiner

P. R. MICHL, Assistant Examiner

U.S. Cl. X.R.

260—41, 884, 885